United States Patent

[11] 3,539,131

[72] Inventor Lyle G. Priest
 San Jose, California
[21] Appl. No. 761,445
[22] Filed Sept. 23, 1968
[45] Patented Nov. 10, 1970
[73] Assignee Information Design, Inc.
 Palo Alto, California
 a corporation of California

[54] APPARATUS FOR CONNECTING FILM TAPES TO WINDING ROLL OF PROJECTORS
 10 Claims, 14 Drawing Figs.
[52] U.S. Cl. ..................................... 242/195,
 242/197
[51] Int. Cl. ..................................... G03b 1/58,
 G11b 15/66
[50] Field of Search ........................... 242/195,
 197, 198, 71.2, 71.3, 71.1

[56] References Cited
 UNITED STATES PATENTS
 2,336,278  12/1943  Mihalyi ......................... 242/71.1X
 2,963,940  12/1960  Raabe ........................... 242/71.2X
 3,025,011  3/1962   Camras ......................... 242/195X
 3,105,645  10/1963  Rost ............................. 242/71.1X
 3,136,464  6/1964   Schmid ......................... 242/195X
 3,153,516  10/1964  De Loof et al. ............... 242/195X
 3,190,575  6/1965   Hayner et al. ................ 242/195

Primary Examiner—George F. Mautz
Attorney—Eckhoff and Hoppe

ABSTRACT: Apparatus for connecting film tapes to the winding roll of projectors and advancing a film strip from a cartridge comprising a lead strip threaded through the projector and having one end engaged with the winding roll; a two-piece connector, one piece mounted to the end of a cartridge film strip and the other piece mounted to the lead strip; and a converter for engaging one end of a film strip with said lead strip including means for releasably engaging the connector-mounted end of said lead strip, and means for operating said engaging means to release the lead strip connector piece upon mounting a cartridge in operative relationship to the projector, the removal of a cartridge allowing said releasable engaging means to reengage and retain the connector mounted end of said film strip in a predetermined position.

Patented Nov. 10, 1970
3,539,131
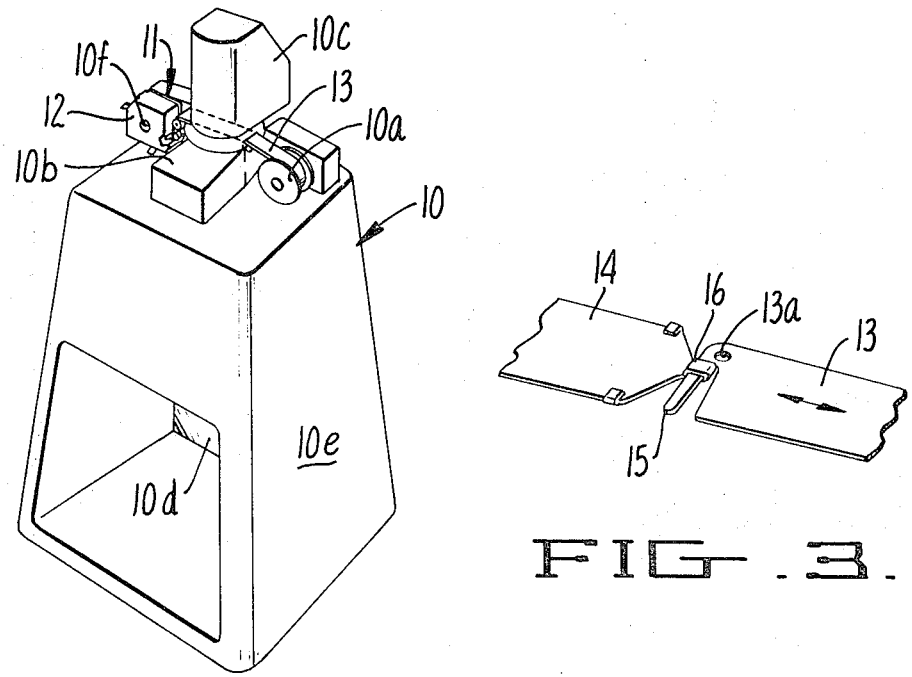
FIG. 1.
FIG. 3.
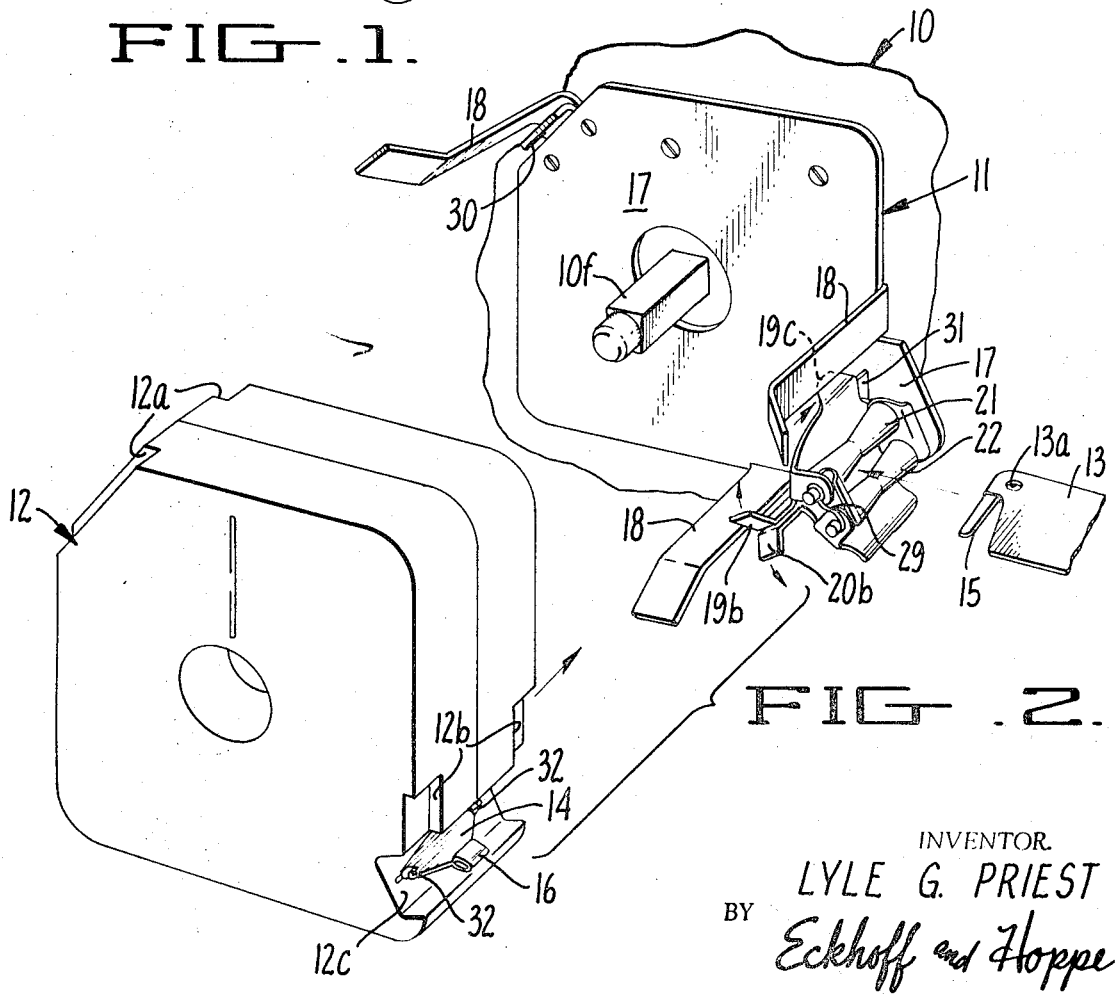
FIG. 2.
INVENTOR.
LYLE G. PRIEST
BY Eckhoff and Hoppe
ATTORNEYS

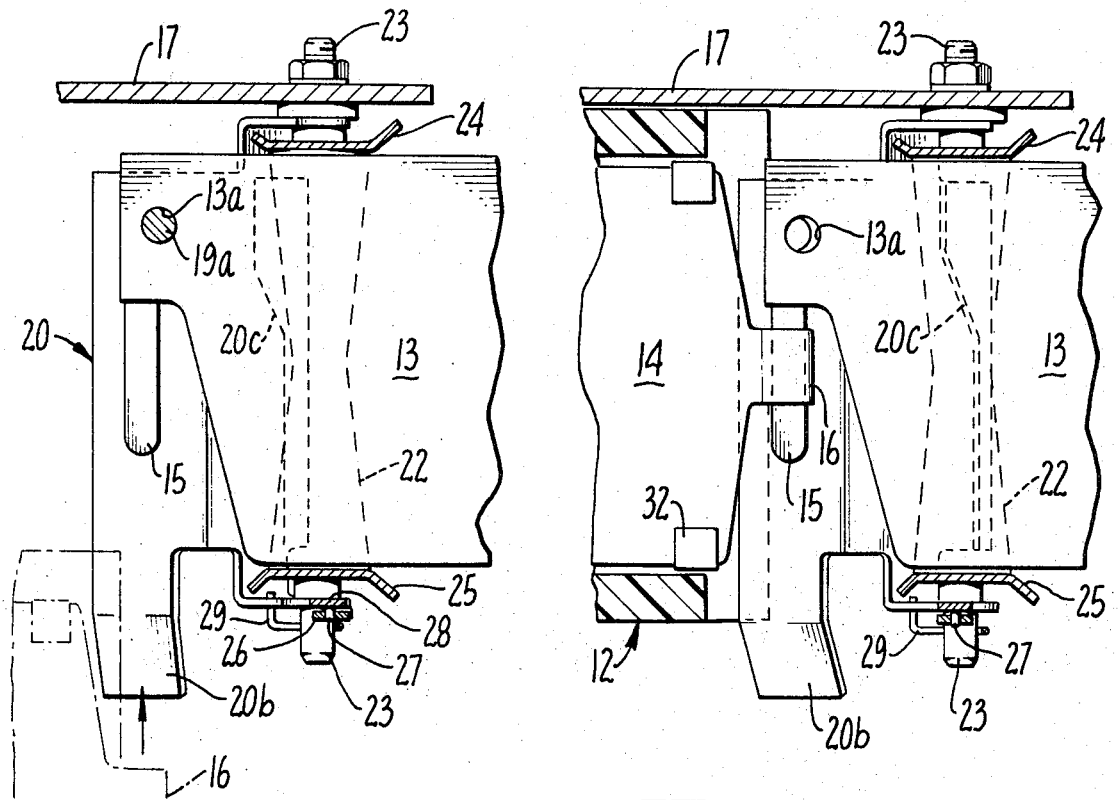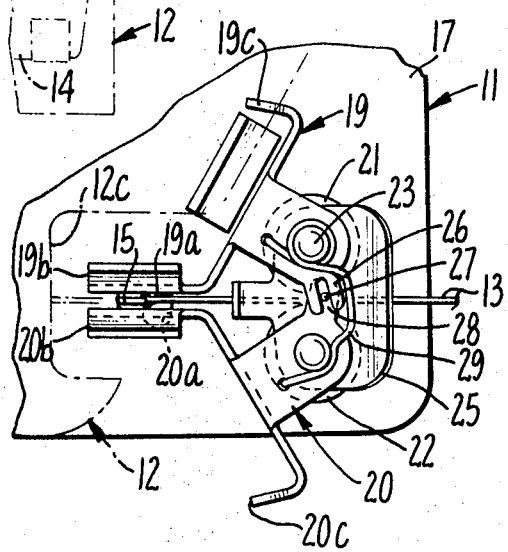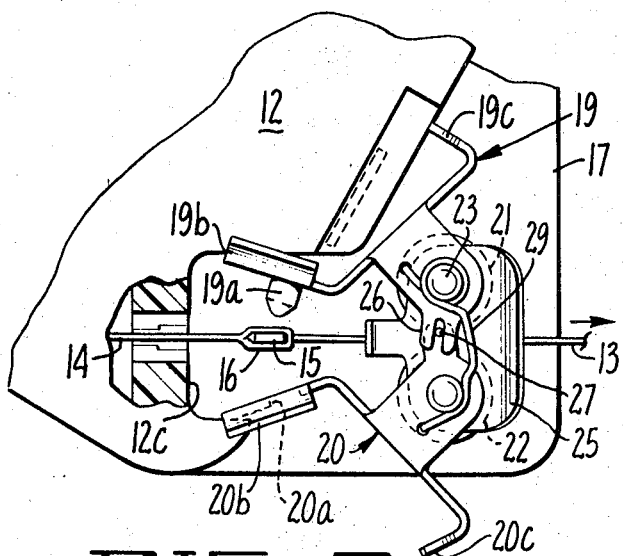

INVENTOR.
LYLE G. PRIEST
BY
Eckhoff and Hoppe
ATTORNEYS

APPARATUS FOR CONNECTING FILM TAPES TO WINDING ROLL OF PROJECTORS

This invention relates generally to film tape projectors and more particularly to a new combination including a converter that eliminates the need for threading a lead strip through a projector each time a new or different film cartridge is to be used therewith.

In brief, this invention teaches a new combination including new devices for advancing a film strip from a film cartridge. This combination includes the use of a lead strip that has been initially threaded through the projector and having one end engaged with its winding roll; a two-piece connector, one piece being mounted to the end of a cartridge film strip and the other piece mounted to the lead strip; and a converter that retains the connector piece of the lead strip in a predetermined position so that it may be engaged with the connector piece of a film strip upon mounting a film cartridge in operative relationship to the projector.

It is one object of this invention to provide a novel combination to simplify the use of film cartridges with projectors of standard construction.

Another object is to provide apparatus of the kind described which avoids the need for repeated threading of a lead strip each time a new cartridge is to be used with a projector.

Another object is to provide apparatus of the kind described and including a two-piece connector comprising a bayonet and loop that are joined by laterally moving one relative to the other upon mounting a film cartridge to a projector and which when assembled may be passed between the guides of a conventional projector.

A further object of this invention is to provide apparatus of the kind described and including a converter having means for supporting a cartridge in operative relationship to conventional film projectors while simultaneously positioning a loop connector piece attached to the film strip in axial alignment with a bayonet connector piece secured to the end of a lead strip.

Another object is to provide apparatus of the kind described including a converter that may be used with either right- or left-hand cartridge mountings of conventional projectors.

And yet another object is to provide apparatus of the kind described that is relatively inexpensive to manufacture and compact of construction but yet dependable in operation.

Various other objects of this invention will become apparent in view of the following detailed description and the accompanying drawings.

In the drawings forming a part of this application and in which like parts are identified by like reference numerals throughout the same:

FIG. 1 is a perspective view of a conventional film tape projector equipped with a preferred form of this invention in a novel converter and related devices for connecting film tapes to the winding roll of the projector;

FIG. 2 is an enlarged perspective view of the film cartridge and converter shown with the projector in FIG. 1, the film cartridge being shown in laterally spaced relation to the converter;

FIG. 3 is a perspective view of the two-piece connector employed for joining the ends of a film strip and a lead strip;

FIG. 6 is an enlarged detail and section taken substantially on lines 6–6 of FIG. 4;

FIG. 7 is an enlarged detail of a portion of the converter shown in FIG. 4;

FIG. 8 is an enlarged detail and section substantially the same as FIG. 6 but with the parts of the converter shown in positions where the ends of a film strip and lead strip have been joined by assembling the two-piece connector;

FIG. 9 is an enlarged detail substantially the same as that shown in FIG. 7 but with the parts of the converter shown in the alternate position corresponding to FIG. 8;

Figure 4:
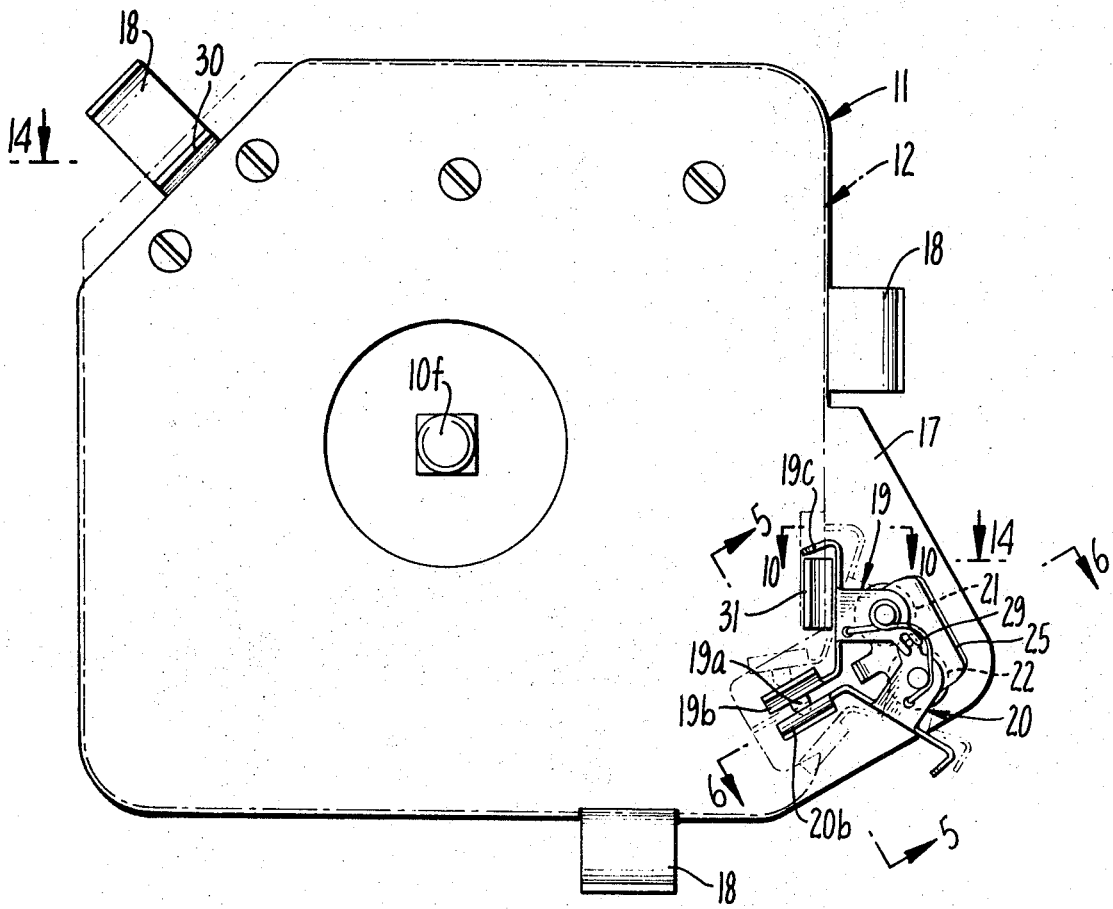
FIG. 4 is a side elevation of the converter.

Referring to FIGS. 1 and 2 in particular, there is illustrated a film projector 10 that is of an essentially conventional construction but modified with an attachment or converter 11 to operate with a film cartridge 12 rather than a conventional reel. As with conventional machines of this type, projector 10 comprises a winding roll 10a for advancing a film strip between a scanner 10b and a light source 10c. A projected image is then viewed on a screen 10d within projector housing 10e.

It is to be further understood that, as a conventional projector, machine 10 normally utilizes a roll of film which is supported on a rotatable rewinding shaft 10f. Conventional rolls of film include a leader which is first threaded through the projector between scanning head 10b and light source 10c, the front end of the leader being subsequently connected to winding reel 10a. The present invention, however, eliminates the need for repeatedly threading each film strip. This is accomplished by providing a lead strip 13 that remains threaded through the projector, and a film strip 14 that is disconnectably joined to lead strip 13 by means of a two-piece connector. The two-piece connector used for joining strips 13 and 14 comprises a bayonet 15 and a loop member 16, and these pieces are axially aligned and engaged as cartridge 12 is laterally positioned over spindle 10f into supporting relationship to the projector and attachment 11.

Attachment 11 essentially comprises a mounting plate 17 having a plurality of fingers 18 for supporting cartridge 12, a pair of pivoted clamping plates 19 and 20 for releasably engaging the end of film strip 13, a pair of guide rollers 21 and 22, and a pair of support pins 23 for mounting clamping plates 19, 20 and rollers 21, 22 to support plate 17. In addition, pins 23 extend through openings formed in a pair of lateral guide plates 24 and 25. These guide plates serve to confine a film strip between the clamping plates and rollers. Guide plate 25 also maintains the unsupported ends of pins 23 in spaced relation.

Clamping plates 19 and 20 are constructed to be pivoted together, one plate being in contact with the other so that as one plate is pivoted, the other clamping plate is also pivoted. For this purpose, clamping plate 19 is formed with a bifurcated offset arm 26 having a slotted passage engaged with a pin 27 carried by an offset arm 28 formed on clamping plate 20. Thus, pivoting either clamping plate 19 or 20 will produce a simultaneous pivotal movement of the other. A spring member 29 interconnects plates 19 and 20 to impose a bias that normally positions them in clamping relation to lead strip 13, as shown in FIG. 7.

Figure 5:
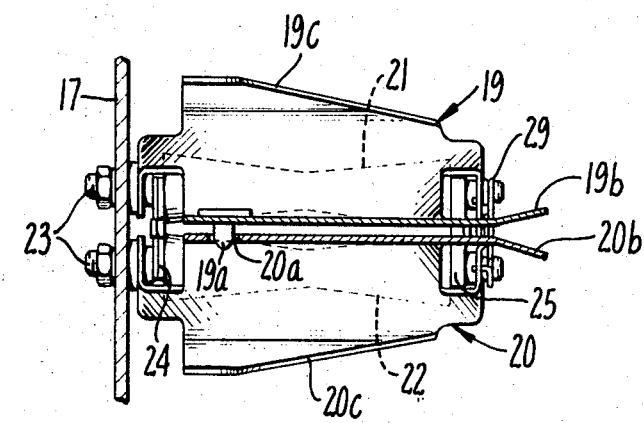
FIG. 5 is an enlarged detail and section taken on lines 5–5 of FIG. 4.

Referring to FIG. 5, clamping plate 19 supports a detent 19a that is generally aligned with and adapted to project through an opening 20a formed in clamping plate 20. In addition, plates 19 and 20 are formed with terminal ends 19b and 20b, respectively, which extend laterally and divergently relative to the other. Ends 19a and 20a serve as a guide for aligning connector piece 16 of a film strip 14 relative to connector piece 15 of lead strip 13.

Clamping plates 19 and 20 are also formed with flanges 19c and 20c, respectively, each flange having a sloped camming edge that may be contacted by a cartridge 12 as it laterally positioned into fingers 18 of attachment 11. With the embodiment illustrated, cartridge 12 only makes contact with the camming surfaces of flange 19c. However, should the clamping plate assembly (including rollers 21, 22 and mounting pins 23) be inverted and supported on the opposite side of mounting plate 17 (as to maintain a structural relationship to keep rollers 21, 22 on the projector side of clamping plates 19, 20), then the camming surface of flange 20c will be contacted by cartridge 12 as the cartridge is mounted upon the attachment. Accordingly, it is to be understood that camming contacts 19c and 20c operate independently of the other, one contact being used for a right-hand mounting — the other for a left-hand mounting.

Referring to FIGS. 6 through 9, lead strip 13 is formed with an opening 13a which may be positioned into alignment with detent 19a and opening 20a, and in such position the lead strip may be pinned as well as clamped in a predetermined position. Thus, the end of lead strip 13, particularly bayonet 15, is so positioned that when cartridge 12 is assembled to attachment 11, loop 16 is automatically aligned with bayonet 15. Moreover, in the process of mounting cartridge 12 upon the attachment 11, an engagement of surfaces between the cartridge and camming surfaces of flanges 19c or 20c pivots both clamping plates to unclamp and release the end of lead strip 13. This operation is best illustrated in FIGS. 7 and 9.

Rollers 21 and 22, it will be noted, have an increased width near their ends as compared with their center sections. Thus, contact is made only with the edges of a film strip fed therebetween, not with the projected areas of the film. If otherwise, the film might be damaged as it is guided from or rewound upon the reel of cartridge 12.

In operation, attachment 11 may be used as a means for converting a projector that normally utilizes a tape reel to one that will receive a cartridge of film. Moreover, the act of mounting a cartridge to the attachment automatically connects the end of the film strip carried in the cartridge to the end of a lead strip already threaded through the projector. Fingers 18 of attachment 11 serve to guide and support the cartridge relative to the end of a lead strip held by clamping plates 19 and 20 in a predetermined position; and, as cartridge 12 is laterally positioned within fingers 18, loop connector piece 16 is first aligned and engaged with bayonet 15. Then, as loop 16 passes over the end of bayonet 15, side edge 12a of the cartridge engages one of the camming surfaces 19c or 20c, thereby forcing clamping plates 19 and 20 against the spring bias 29 retracting detent 19a. This releases the end of lead strip 13, allowing it (as well as connected film strip 14) to be wound upon reel 10a.

Figure 10:
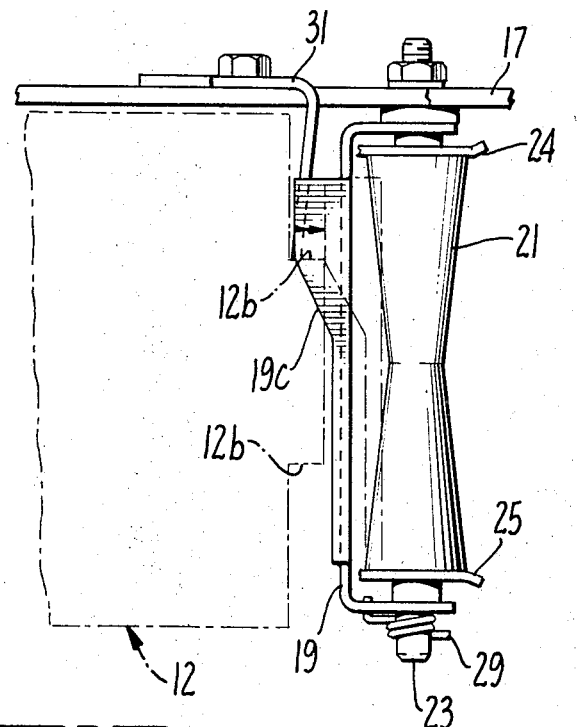
FIG. 10 is an enlarged detail and section of selected portions of the converter as viewed along lines 10–10 of FIG. 4.
Figure 14:
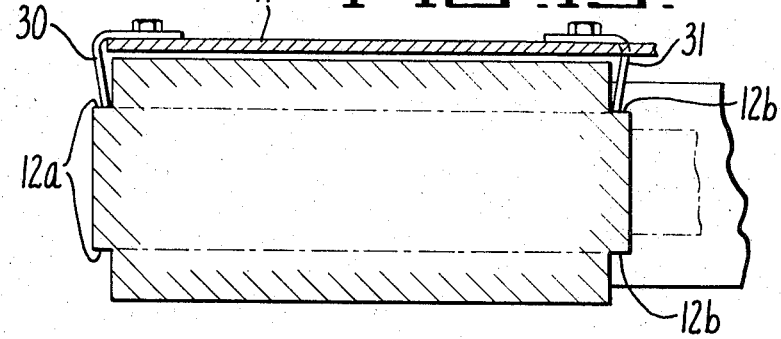
FIG. 14 is a transverse section of the mounting plate for supporting a film cartridge with positional stops that allow various widths of film to be used with the same converter.

It is further contemplated that attachment 11 may be made with stops 30 and 31 that engage the lateral surface of cartridge 12 to position different widths of film which may be contained therein. Thus, the side clearances between the surface of the cartridge and the stops may be independent of the film thickness as, for example, whether it be a 16 mm. type or 35 mm. Referring to FIGS. 10 and 14 in particular, stops 30 and 31 secured to mounting plate 17 engage recessed surfaces 12a and 12b of cartridge 12. It will be further apparent that the contacts between the stops and surfaces of the cartridge center the film strip contained in the cartridge relative to clamping plates 19, 20 and rollers 21, 22. This will be as true for a cartridge that houses 16 mm. film (having the broken line shape shown in FIG. 14) as with the cartridge that houses 35 mm. film. Thus, converter 11 may be used with cartridges having the same or different widths for housing various sizes of film. It is only necessary that the cartridges be recessed a proper depth to engage the stops.

Figure 12:
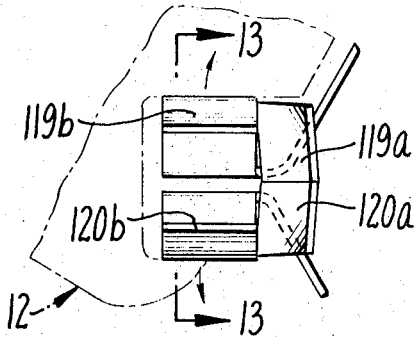
FIG. 12 is an end view of a pair of clamping members constructed as shown in FIG. 11.
Figure 13:
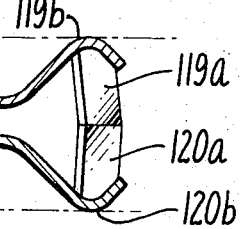
FIG. 13 is a section taken on lines 13–13 of FIG. 12.

As indicated above, the end of lead strip 13 is held in a predetermined position by clamps 19 and 20 so that loop 16 of a film strip 14 may be aligned and engaged with bayonet 15 of lead strip 13. But a proper alignment can only be assured if the film strip 14 is completely wound upon the reel of cartridge 12 as to bring loop 16 into a predetermined position relative to the cartridge. This positioning is assured by a pair of stops 32 that engage the surface of a recess 12c formed in the cartridge and having a width sufficient to receive the ends 19b, 20b of the clamping plates. It is possible, of course, for the film strip 14 to be inadvertently extended a short distance sufficient to misalign loop 16 relative to bayonet 15. Such condition, when noted, may be manually corrected by simply rotating the cartridge reel to bring stops 32 into surface engagement with recess 12c. On the other hand, minor extensions of the film strip may be corrected by providing a clamping plate such as shown in FIGS. 11 through 13.

Figure 11:
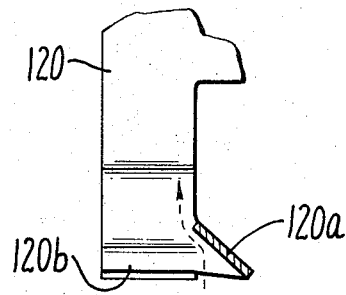
FIG. 11 illustrates a modified form of clamping member having a camming surface for forcing the connector piece of a cartridge tape into alignment with the connector piece of a lead strip.

Referring to FIG. 11, clamping plates 119 and 120 are formed with camming appendages 119a and 120a, respectively. Each appendage projects laterally and forwardly relative to the direction in which the film tape moves out from cartridge 12. Thus, should loop 16 project abnormally from cartridge 12, contact will be made between the loop and the surfaces of camming appendages 119a and 120a, thereby forcing the loop backward into alignment with bayonet 15.

Clamping plates 119 and 120 also differ from plates 19 and 20 in that each is formed with a curvature 119b and 120b, respectively. These curvatures terminate in a direction of convergency that allows recess 12c of cartridge 12 to be more easily engaged therewith by a lateral movement, the surfaces of curvatures 119b and 120b producing those slight vertical adjustments which may be necessary to effect proper alignment.

Although a preferred embodiment and several modifications of this invention have been illustrated and described, various modifications and changes may be resorted to without departing from the spirit of the invention or the scope of the attached claims, and each of such modifications and changes is contemplated.

I claim:

1. In combination with a film cartridge and a film projector, said projector having a winding roll for advancing a film strip from said cartridge; a lead strip threaded through the projector and having one end engaged with said winding roll; a two-piece connector, one piece mounted to the end of a cartridge film strip and the other piece mounted to said lead strip; and a convertor for engaging one end of a film strip with said lead strip; and a convertor for engaging one end of a film strip with said lead strip comprising a pair of clamping plates for releasably engaging the connector-mounted end of said lead strip, each plate pivotally mounted on opposite sides of the lead strip and biased to positions that clamp the lead strip therebetween, and means for operating said pair of clamping plates to release said lead strip connector piece upon mounting a cartridge in operative relationship to said projector, the removal of a cartridge allowing said pair of clamping plates to reengage and retain the connector-mounted end of said lead strip in a predetermined position.

2. The combination of claim 1, one of said clamping plates having an opening therein and the other supporting a detent engageable with the opening of the first, the connector piece of said lead strip having a complementary opening alignable with the opening and detent of said clamping plates.

3. The combination of claim 1, said means for operating said engaging means to release said lead strip comprising a cam carried by one of said clamping plates, said cam having a sloped surface positioned to be engaged by said cartridge as said cartridge is moved laterally into operative relationship to said projector.

4. The combination of claim 1, said means for operating said engaging means to release said strip comprising a pair of cams, one cam being carried by each clamping plate and having a sloped surface positioned to be engaged by a cartridge as it is moved laterally into operative relationship to a projector, one cam being engaged by a left-hand mounted cartridge and the other cam being engaged by a right-hand mounted cartridge.

5. The combination of claim 1, each of said clamping plates extending laterally and being divergent at one end to receive and align the connector piece of said film strip with the connector piece of said lead strip.

6. The combination of claim 5, said cartridge having a recess for receiving the laterally extending and divergent ends of said clamping plates as said cartridge is moved laterally into operative relationship with said projector.

7. An attachment for mounting a film cartridge to a film projector that eliminates the need for threading a lead strip through the projector each time a new or different cartridge is to be used therewith, comprising: a pair of clamping plates for releasably engaging the end of a lead strip, each plate pivotally mounted and biased to positions that clamp a lead strip therebetween, means for supporting a cartridge upon said projector in juxtaposed relation to said lead strip and positioning the end of a cartridge film strip into engagement with the end of an engaged lead strip, and means for operating said pair of clamping plates to release said lead strip as a cartridge is moved into supporting relationship to the projector and attachment, the removal of a cartridge allowing said pair of clamping plates to reengage and retain the end of said lead strip in a predetermined position.

8. The attachment of claim 7, one of said clamping plates having an opening therein and the other supporting a detent engageable with the opening of the first for pinning a lead strip in a predetermined position.

9. The attachment of claim 8, said means for operating said releasable engaging means comprising a cam carried by one of said clamping plates, said cam having a sloped surface positioned to be engaged by a cartridge that is moved laterally into supporting relationship to the projector and attachment.

10. The attachment of claim 8, each of said clamping plates extending laterally and being divergent at one end to receive and align the end of a film strip with the end of a lead strip held by said releasable engaging means.